United States Patent [19]

Uffner

[11] Patent Number: 4,591,531
[45] Date of Patent: May 27, 1986

[54] HOT-MELT ADHESIVE FOR THERMAL INSULATING ARTICLES

[75] Inventor: William E. Uffner, Newark, Ohio

[73] Assignee: Owens-Corning Fiberglas Corporation, Toledo, Ohio

[21] Appl. No.: 407,393

[22] Filed: Aug. 12, 1982

[51] Int. Cl.$^4$ ............................................. B32B 11/00
[52] U.S. Cl. ...................................... 428/468; 428/344; 524/64; 524/69; 138/DIG. 1; 138/DIG. 10; 138/137; 138/149
[58] Field of Search ................... 524/64, 69; 428/468, 428/428, 344; 138/137, DIG. 1, DIG. 10, 149

[56] References Cited

U.S. PATENT DOCUMENTS

| | | | |
|---|---|---|---|
| 3,025,254 | 3/1962 | Cull | 524/64 |
| 3,442,841 | 5/1969 | Adelman | 524/69 |
| 3,869,417 | 3/1975 | Ramsay | 524/69 |
| 3,896,069 | 7/1975 | Kosaka et al. | 524/69 |
| 3,980,598 | 9/1976 | Moorwessel et al. | 524/69 |
| 4,064,082 | 12/1977 | Henschel . | |
| 4,105,612 | 8/1978 | Cushman et al. . | |
| 4,201,812 | 5/1980 | Hagenbach et al. . | |

OTHER PUBLICATIONS

U.S. Industrial Chemicals Co., "Polyolefino for Adhesives and Coating".

*Primary Examiner*—Edith Buffalow
*Attorney, Agent, or Firm*—Ronald C. Hudgens; Robert F. Rywalski; Debra L. Pawl

[57] ABSTRACT

Thermal insulating articles are disclosed of the type which comprises a laminate of thermal insulation and a flexible jacket material with the jacket and thermal insulation being directly adhesively adhered to each other by means of a hot-melt adhesive. The hot-melt adhesive employed consists essentially of an asphaltene enriched asphalt, an ethylene-vinyl acetate copolymer and a wax.

5 Claims, No Drawings

HOT-MELT ADHESIVE FOR THERMAL INSULATING ARTICLES

TECHNICAL FIELD

The present invention relates to hot-melt adhesives and more particularly to asphaltic base adhesives. Even yet, more particularly, the present invention relates to asphaltene-enriched asphalt based adhesives, especially adapted for the use as a hot-melt adhesive in manufacturing thermal insulation, such as jacketed pipe insulation.

BACKGROUND AND SUMMARY

Thermally insulating articles are well known in the art which comprise a laminated structure of thermal insulation and a flexible jacket with the insulation and jacket being directly adhesively adhered to each other by means of a hot-melt adhesive. One such type of article is pipe insulation, which includes an inner layer of thermal insulation, in the form of a hollow cylindrical member of insulation, usually slitted and opened at one end and usually hinged at the other to facilitate its positioning around pipe for insulation purposes. The thermal insulation typically comprises an inorganic fiber such as, for example, glass or mineral fiber, and a binder, which thermally sets the fibers together with the binder typically being a phenol formaldehyde. Disposed externally of the thermal insulation, and adhesively secured thereto, is a flexible jacket of single-piece construction, which jacket includes an inwardly disposed vapor barrier, typically a metal foil such as for example, aluminum foil, and an externally disposed paper material. In many instances, the jacket will also include a glass reinforcement, for example, glass scrim, intermediate the vapor barrier, and paper. The jacket is adhesively secured to the thermal insulation by means of a hot-melt adhesive, and the jacket typically employs a pressure sensitive adhesive, which allows for overlapping of longitudinal end portions of the jacket, and by means of the pressure sensitive adhesive allowing for the securing of overlapping portions of the inner surface of one end to the outer portion of an opposite end of the jacket, whereby the pipe insulation can be mounted and secured about the pipe which it is intended to insulate. Such articles are exemplified in U.S. Pat. No. 4,022,248.

In the past, polypropylene has been used as the hot-melt adhesive, but it is generally a relatively expensive material, and there is a need in the art to provide for a more economical hot-melt adhesive, which has all of the needed properties to allow its use in producing the above described thermally insulating articles.

Thus, in accordance with the present invention, there is provided an improved hot-melt adhesive especially adapted for use in forming pipe insulation, which adhesive consists essentially of an asphaltene enriched asphalt, an ethylene-vinyl acetate copolymer and an oxidized micro-crystalline petroleum wax.

DESCRIPTION AND INDUSTRIAL EXPLOITATION

As indicated above, the hot-melt adhesives contemplated herein, consist essentially of an asphaltene enriched asphalt, an ethylene-vinyl acetate copolymer and an oxidized micro-crystalline petroleum wax. In addition to formulations which have a fine balance of properties and are specifically adapted for purposes of forming laminated thermally insulating articles, e.g. pipe insulation as generally described above, the present invention also contemplates adhesives which are employable for a wide variety of applications as a hot melt adhesive. Representative of such other application are, for example, the use of such adhesives as a hot melt adhesive for box closures, that is, in adhesively securing respective flaps of corrugated containers to each other.

In general, the high asphaltene enriched asphalt employed in the present invention is employed as the base material and is a relatively inexpensive material. The ethylene-vinyl acetate copolymer, while generally increasing the viscosity, primarily serves to enhance the low temperature toughness of the adhesive, while the wax serves to decrease the viscosity, and consequently imparts the ability for controlling the flow properties of the adhesive. The proportion of materials employed will vary depending on a specific application, but in general, it will be found that a highly desirable hot-melt adhesive will be obtained by employing the asphaltene enriched asphalt in an amount of about 43-75% by weight, the wax in an amount of about 12-31% by weight, and the ethylene-vinyl acetate copolymer in amount of about 22-38% by weight. Especially suitable adhesives were formed by employing an asphaltene-enriched asphalt in an amount of about 50% by weight, oxidized micro-crystalline petroleum wax in an amount of about 25% by weight and ethylene-vinyl acetate copolymers in an amount of about 25% by weight.

In the deasphalting of reduced crude oils and vacuum residues, i.e., the deasphalting of residues of refining towers (vacuum or gravity), asphalt is generally viewed as being composed of three fractions, namely an asphaltene fraction, a resin fraction and an oil fraction. These fractions are typically analyzed by the Corbett analysis or Streeter analysis. Solvent extraction techniques, for example, with the use of $C_3$–$C_5$ alkanes are known for such deasphalting and leave asphalt residues high in asphaltene content. Thus, the term asphaltene-enriched asphalt as used herein contemplates the use of those asphalts in which the asphaltene content has been enriched relative to the reduced crude oil and/or vacuum residue feedstock. While such asphaltene-enriched asphalt still contains resin and oil fractions, the asphaltene content of such asphaltene-enriched asphalts will be larger than either the amount of resin or the amount of oil therein. Typically, such an asphaltene-enriched asphalt will show the presence of in excess of about 40% of asphaltenes, less than about 27% resin and less than about 33% of oil. Such materials are relatively inexpensive because the materials essentially occur as the residual by-product of processes which are intended to extract the higher value resin portion and the higher value oil portion. One such suitable material is available from Pester Refining Company and, in general, materials which are outstandingly adapted for the present purposes are the asphaltene fraction, i.e. the asphaltene-enriched asphalt residual product, of the ROSE process, i.e. the residuum oil supercritical extraction process, for example, that developed by Kerr-McGee Refining Corporation. Typically, such asphaltene-enriched asphalts are very hard and have a penetration (77° F.) of less than about 1 and, quite frequently, substantially a zero penetration. Their softening points are in excess of about 190° F. and typically about 190° F. to about 300° F.

The ethylene-vinyl acetate copolymers employed herein are well known to those skilled in the art and are commercially available under the trade name "Elvax" resins from the E. I. duPont de NeMours Company, and are also available from USI Chemicals under the trade designation "Ultrathene" and "Vynathene" copolymers. The amount of vinyl acetate present in these copolymers may vary over wide ranges but is generally preferred to employ such copolymers wherein the vinyl acetate is present in an amount of about 9 to about 60% by weight. Especially fine results have been obtained by employing vinyl acetate contents in the range of about 39–42% by weight.

The oxidized micro-crystalline petroleum waxes used for forming the hot melt adhesive to adhere the metal foil portion, e.g. aluminum foil, of a flexible jacket to the inwardly disposed thermal insulation in forming pipe insulation are well known waxes and are commercially available, for example, from the Bareco Division of Petrolite Corporation. Exemplary of suitable oxidized micro-crystalline petroleum waxes are those having acid numbers generally in the range of about 5 to about 50 and melting points generally in the range of about 190°–225° F. (88°–107° C.). They are compatible with the other two constituents. This compatibility can be easily checked by simply blending the ingredients at an elevated temperature and then casting films therefrom. Compatibility will be indicated by the films exhibiting a homogeneous substantially single phase characteristic.

The hot-melt adhesives are quite easily formulated, but, in general, it is preferred to add the asphaltene enriched asphalt to a heated-agitated reactor and then heat the asphalt to above its melting point, preferably to a temperature on the order of about 200° C. at which time the wax is slowly added and the ethylene-vinyl acetate copolymer, allowing them to melt and then homogenizing the mixture by mixing for about 2–4 hours.

Adhesives formulated in accordance with the present invention will exhibit good bonding to metallic vapor barrier foils, and especially to aluminum, and they will also exhibit good wetting out of such foils. Additionally, such compositions, when employed to bond aluminum foil of a flexible jacket to thermal insulation, will show good adhesion over a temperature range from about −20° F. to about 180° F. Generally, such formulations will exhibit good low temperature flex at about 30°–35° F. and even as low as 20° F. Another outstanding feature of the present compositions is the fact that they are non-blocking, or free flowing, when formed into solid shapes, for example, shapes in which the cross section is generally rectangular. This is quite important because, as indicated above, these compositions are intended for use as hot melts and, generally, in the manufacture of such materials, the hot melt is first cast and then cut into solid articles which are then stored and fed to a heating unit where they are melted. It consequently becomes quite important that these materials be free flowing, or non-blocking, to provide for an economical expedient operation.

While the above describes the present invention with sufficient particularity, the following is intended to further exemplify the present invention.

EXAMPLE

As represented in Table 1, two samples were prepared using the portions of materials indicated therein. These hot melts were prepared by melting asphaltene-enriched asphalt in a reactor equipped with an agitator. Once the asphalt was melted, the ethylene-vinyl acetate copolymer and the indicated waxes were added slowly with agitation to ensure good wetting and mixing.

TABLE I

| Material | Sample (%) 1 | Sample (%) 2 |
|---|---|---|
| Elvax 40P copolymer (Dupont) | 25 | — |
| Asphaltene enriched asphalt (Softening Point 216° F.) | 50 | 50 |
| Cardis 320 wax (Petrolite) | 25 | 25 |
| Vynathene EY-902-30 copolymer (USI) | — | 25 |
| Viscosity (cps.) at | | |
| 350° F. | 3200 | 3100 |
| 375° F. | 2180 | 2100 |
| 400° F. | 1550 | 1500 |
| 350° F. | 3200 | 3080 |

Once the materials were all added, the ingredients were blended by heating at about 200° C. for about 2–4 hours, after which time the reactor was emptied and the composition was cast into sheets. The sheets were then cut into shapes, generally having a rectangular cross-section, and then were employed as a hot melt for purposes of adhesively securing a flexible jacket having an inner aluminum foil vapor barrier to thermal insulation. It was first of all noticed that the shapes were non-blocking in that they exhibited good free flow with no unacceptable adhesion of the respective shapes to each other. The samples showed excellent wet out of the aluminum foil and provided a good bond between the aluminum foil and the thermal insulation in the temperature generally of about −20° F. to about 180° F.

While the above describes the present invention, it will, of course, be apparent that modification is possible which, pursuant to the patent statutes and laws, do not depart from the spirit and scope thereof.

I claim:

1. In an article comprising thermal insulation and a flexible jacket material having a metallic foil directly adhered to said insulation by a hot melt adhesive, the improvement wherein said adhesive is free from polypropylene and consists essentially of about 43–75% by weight of asphaltene-enriched asphalt, said asphalt including in excess of about 40% asphaltene, less than about 27% resin and less than about 33% oil; from about 22–38% by weight of an ethylene-vinyl acetate copolymer and a compatible amount in the range of 12–31% by weight of an oxidized micro-crystalline petroleum wax.

2. The article of claim 1 wherein the metallic foil is an aluminum foil.

3. The article of claim 1 wherein said asphaltene-enriched asphalt has a softening point in excess of about 190° F.

4. The article of claim 3 wherein said wax has an acid number in the range of about 5–50 and a melting point in the range of about 88°–107° C.

5. The article of claim 1 wherein said asphalt is employed in the amount of about 50% by weight, the wax in the amount of about 25% by weight and the ethylene-vinyl acetate copolymer in an amount of about 25% by weight.

* * * * *